US011873770B1

(12) United States Patent
Mikulski et al.

(10) Patent No.: US 11,873,770 B1
(45) Date of Patent: Jan. 16, 2024

(54) SUPERCHARGER PRESSURE RATIO AND TEMPERATURE LIMITING SCHEME TO PROTECT HARDWARE

(71) Applicant: Ford Global Technologies, LLC, Dearborn, MI (US)

(72) Inventors: Kevin Mikulski, Livonia, MI (US); Michael Simon, Plymouth, MI (US); Christopher Blanchet, Canton, MI (US); David Bell, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/933,642

(22) Filed: Sep. 20, 2022

(51) Int. Cl.
*F02D 13/02* (2006.01)
*F02B 37/18* (2006.01)
*F02B 39/16* (2006.01)
*F02D 41/00* (2006.01)

(52) U.S. Cl.
CPC ........ *F02D 13/0215* (2013.01); *F02B 37/186* (2013.01); *F02B 39/16* (2013.01); *F02D 13/0261* (2013.01); *F02D 41/0007* (2013.01); *F02B 2039/164* (2013.01); *F02D 2041/001* (2013.01); *F02D 2200/0414* (2013.01)

(58) Field of Classification Search
CPC ............. F02D 13/0215; F02D 13/0261; F02D 41/0007; F02D 2041/001; F02D 2200/0414; F02B 37/186; F02B 39/16; F02B 2039/164

USPC ......................................................... 123/320
See application file for complete search history.

(56) References Cited

U.S. PATENT DOCUMENTS

| 9,677,479 | B2 | 6/2017 | Boyer et al. | |
|---|---|---|---|---|
| 10,060,341 | B2* | 8/2018 | Xiao | F02B 37/14 |
| 10,100,770 | B2 | 10/2018 | Dudar | |
| 2014/0251239 | A1 | 9/2014 | Richards et al. | |
| 2014/0326225 | A1* | 11/2014 | Shioda | F01M 13/00 123/559.1 |
| 2017/0350326 | A1 | 12/2017 | Shibaike et al. | |
| 2018/0171898 | A1 | 6/2018 | Ulrey et al. | |
| 2020/0400106 | A1* | 12/2020 | Hakeem | F02M 26/42 |

FOREIGN PATENT DOCUMENTS

JP          2016130476 A        7/2016

* cited by examiner

*Primary Examiner* — Logan M Kraft
*Assistant Examiner* — John D Bailey
(74) *Attorney, Agent, or Firm* — Vincent Mastrogiacomo; McCoy Russell LLP (57) ABSTRACT

Systems and method are provided for an internal combustion engine with boosted operation. In an example, this includes operating the engine with boosted intake pressure via a supercharger and with supercharger flow regulated by a vacuum actuated bypass valve, and in response to a supercharger outlet temperature greater than a first threshold, increasing a blow through air passing from the engine intake to engine exhaust without combustion in a cylinder of the engine due to engine intake and exhaust valves having positive valve overlap; and then in response to the supercharger outlet temperature greater than a second, higher, threshold, limiting engine airflow.

14 Claims, 7 Drawing Sheets

SUPERCHARGER PRESSURE RATIO AND TEMPERATURE LIMITING SCHEME TO PROTECT HARDWARE

FIELD

The present disclosure relates to a system and method to mitigate supercharger temperature by adjusting various operating conditions in an engine system.

BACKGROUND AND SUMMARY

Combustion engines may utilize boosting devices to increase cylinder air charge, and thus increase torque output. During sustained high torque output with boosted operation, temperatures within the system may increase beyond design constraints and may cause degradation to components. For example, a supercharger outlet temperature may increase to a level at which mitigation actions are taken. Various parameters, such as bypass flow, can affect the temperature. However, the use of bypass flow can sometimes be limited at high power outputs when utilizing a vacuum operated bypass valve. As another example, engine airflow may be reduced to reduce temperature, but such operation thus limits engine output during peak requests.

The inventors have recognized the above issues and provided various system and methods to at least partially address them. In an example, a method for an internal combustion engine comprises operating an engine with boosted intake pressure via a supercharger and with supercharger flow by a vacuum actuated bypass valve; and in response to a supercharger outlet temperature greater than a first threshold, increasing a blow through air passing from the engine intake to engine exhaust without combustion in a cylinder of the engine due to engine intake and exhaust valves having positive valve overlap; and then in response to the supercharger outlet temperature greater than a second, higher, threshold, limiting engine airflow. For example, the bypass may limit supercharger boost by recirculating some flow through the compressor and directing some of it back to the intake, the bypass valve can be affected by engine manifold pressure and for example may not fully regulate supercharger flow across the full range of operation when manifold vacuum is limited. As such, blow through air may be adjusted.

In this way, even when a vacuum actuated bypass valve adjustment is limited or unavailable due to limited vacuum, before limiting airflow, blow through operation can be provided in an initial attempt to mitigate temperature. However, if pressure ratios continue such that temperature continues to increase, airflow mitigation can then be used. In this way, less airflow mitigation can be achieved under some conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
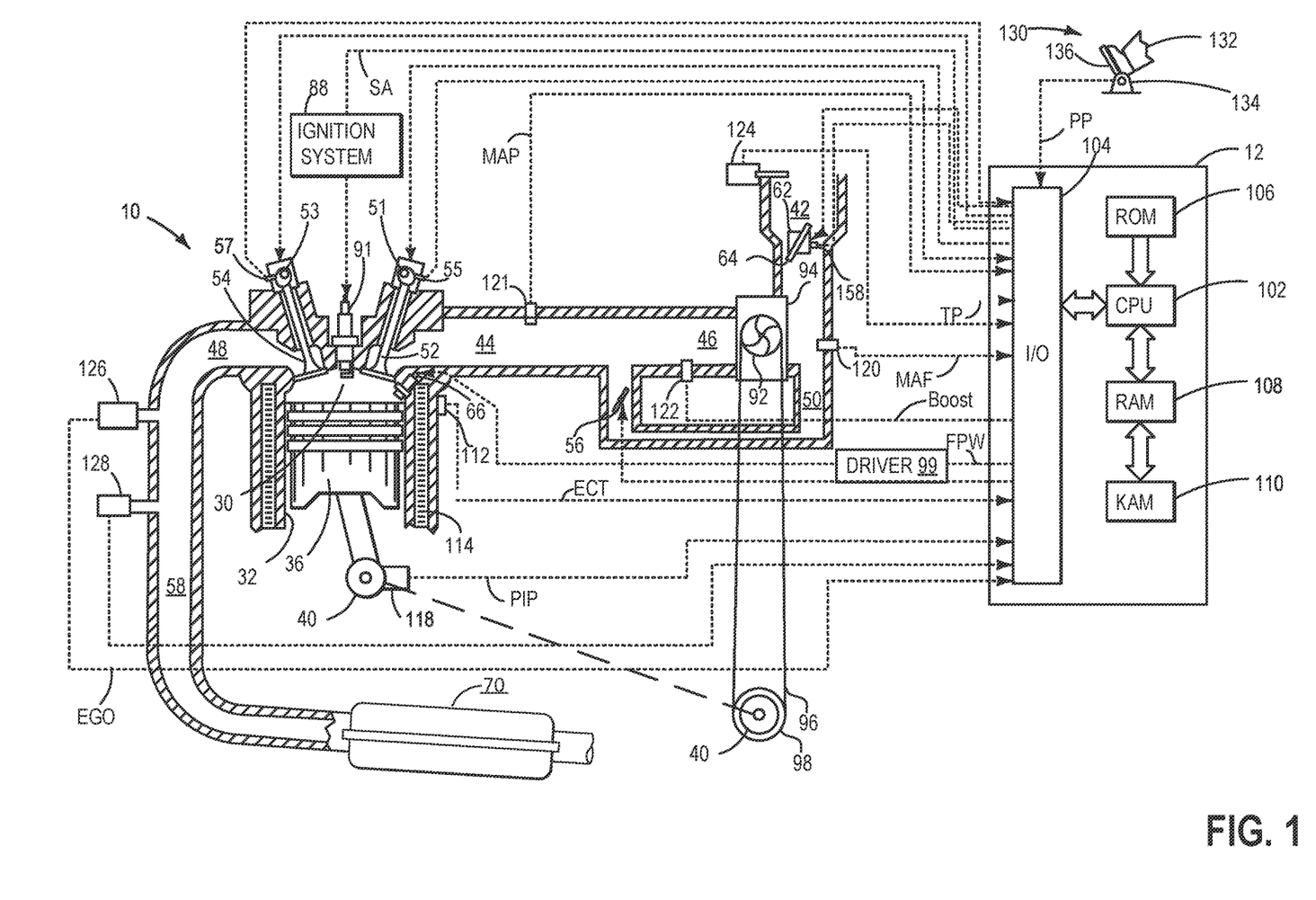
FIG. 1 shows a schematic diagram of an example cylinder within an engine and boosting device.
Figure 2:
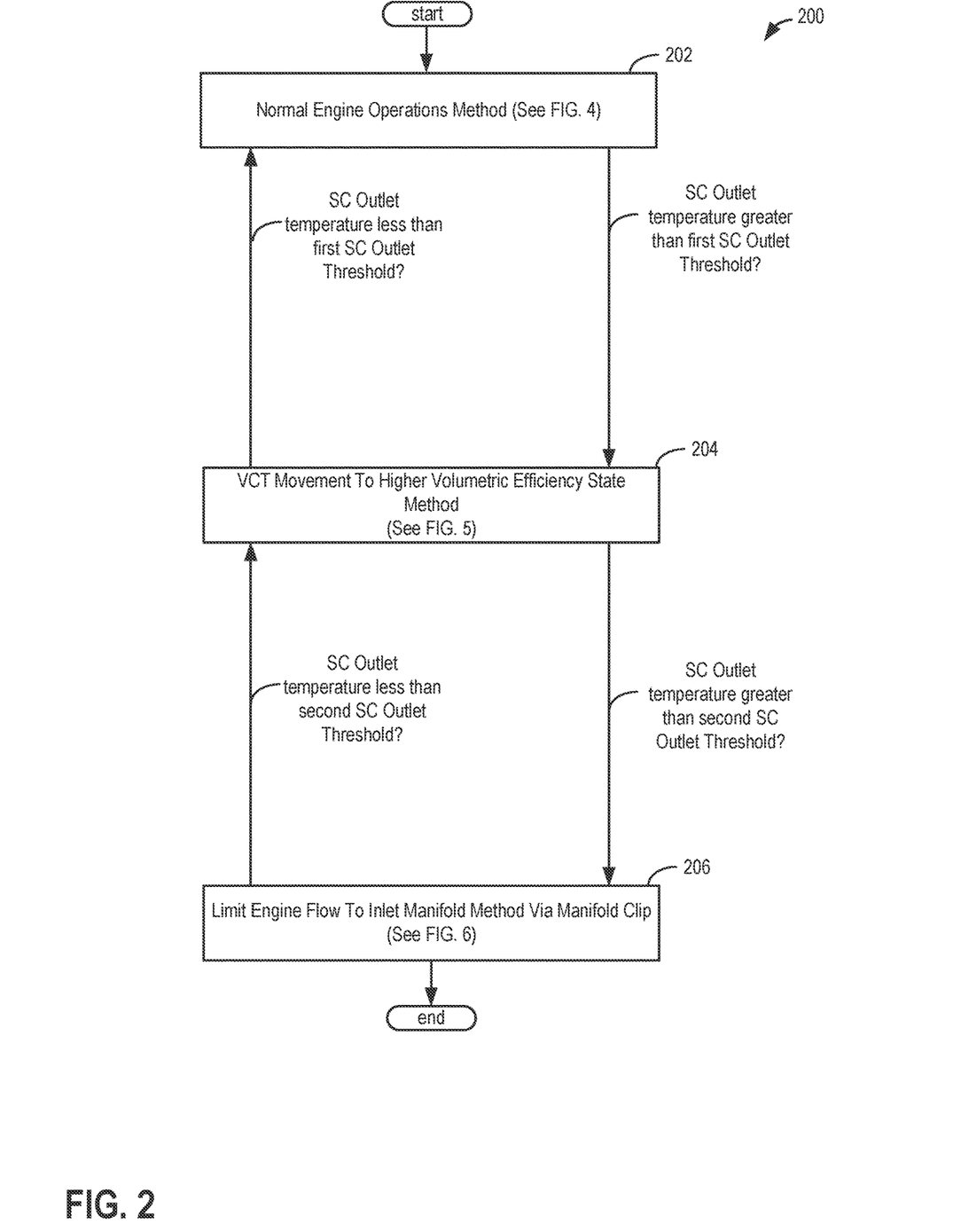
FIG. 2 shows a state diagram of the methods for regulating a cam system, valves, and boosting device.

The following description relates to operating an engine system, such as the engine system of FIG. 1. The engine system may be a four-stroke engine capable of transitioning between different supercharger operational modes as shown in FIG. 2. The modes provide for different amounts of volumetric efficiency adjustments and airflow mitigation to maintain supercharger temperatures within acceptable ranges, even during sustained high load engine operation over extended periods with high temperature. Various methods of operation to carry out the various modes are described in FIGS. 3-6, including a temperature sorting and analysis method shown in the flow chart of FIG. 3. The controller may be configured to make decisions for the engine cam system, manifold components, and/or super charger via the routines in FIG. 4 for the normal operations mode, FIG. 5 for the VCT to higher volumetric efficiency mode, and FIG. 6 for an airflow mitigation mode, such as airflow clipping. A series of time charts may show examples of the response of components and systems to temperature over time in FIG. 7, following the methods described in FIGS. 2-6, for example.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

As used herein, the terms "approximately" is construed to mean plus or minus five percent of the range unless otherwise specified.

Referring now to FIG. 1, it shows a schematic depiction of a spark ignition internal combustion engine 10. Engine 10 may be controlled at least partially by a control system including controller 12 and by input from a vehicle operator 132 via an input device 130. In this example, input device 130 includes an accelerator pedal 136 and a pedal position sensor 134 for generating a proportional pedal position signal PP.

Combustion chamber 30 (also referred to as a cylinder) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Air and other gasses that travel into the engine 10 via the intake manifold may be referred to as engine intake. Gases whether combustion gases formed of the reaction and/or blow through exiting through the exhaust manifold 48 may be referred to as engine exhaust. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 1, intake valve 52 and exhaust valve 54 may be controlled by cam actuation via respective cam actuation systems 51 and 53. The intake valve may have an intake valve timing, e.g. the timing for the intake valve 52 to open and close. The exhaust valve 54 may have an exhaust valve timing, e.g. the timing for the exhaust valve 54 to open and close. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 12 to vary valve operation. VCT and VVT may affect the intake and exhaust valve timing of the intake and exhaust valves 52, 54, respectively. For example, a change in the VCT and VVT may change the intake valve 52 and exhaust valve 54 to have or have a longer positive valve overlap, wherein the intake valve 52 and exhaust valve 54 are both open for the same period of time. For another example, a change in the VCT and VVT may change the intake valve 52 and exhaust valve 54 to have or have a longer negative valve overlap, wherein the intake valve 52 and exhaust valve 54 are both closed for the same period of time (e.g., after exhaust valve closing and before intake valve opening around piston motion near top dead center).

The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

For the example in FIG. 1, a fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 91 in response to spark advance signal SA from controller 12, under select operating modes. The spark plug 91 and ignition system 88 may have a timing referred to herein as a spark timing controlled by controller 12. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 94 arranged along intake passage 42. For example, the engine 10 includes a supercharger to provide engine 10 with boosted intake pressure. For a supercharger, compressor 94 may be at least partially driven by the engine and/or an electric machine, and may not include an exhaust turbine. For this example, the supercharger contains a compressor 94 that may be at least partially driven by a first drive pulley part of an intake turbine 92 mechanically coupled to the crankshaft 40. A second drive pulley 98 may be coupled to and rotate about the crankshaft 40. The first drive pulley and intake turbine 92 may be mechanically coupled to the second drive pulley 98 via a drive belt 96. The mechanical energy from the crankshaft 40 to the supercharger via the second drive pulley and drive belt, may force the intake turbine 92 to draw air from intake passage 42 into the compressor 94. The compressor 94 draws and compresses air from intake passage 42 to supply boost chamber 46.

For another example, the engine may include a turbocharger. For a turbocharger, compressor 94 may be at least partially driven by an exhaust turbine (e.g. via a shaft) arranged along exhaust passage 58.

The compressor may also have a bypass channel 50. The bypass channel 50 may be in communication with the intake passage 42 and the boost chamber 46. For example, if the pressure of the air from the compressor 94 is greater than a maximum threshold pressure, a bypass valve 56 may be adjusted in order to adjust an opening to the boost chamber 46. For this example, the bypass valve 56 may be a vacuum operated bypass valve (e.g., a vacuum actuated bypass valve controlled by the controller utilizing engine generated vacuum for actuation of the valve), wherein the bypass valve 56 is actuated via a vacuum actuator. For this example, the air in the boost chamber 46 may be in communication with the intake passage 42 through the bypass channel 50. The bypass valve 56 may operate as a supercharger bypass valve and adjust the flow of air, e.g., a supercharger bypass flow, bypassing the supercharger to the intake passage. For one example, the bypass valve 56, e.g., the supercharger bypass valve, may be the only bypass valve for and near the supercharger. For this example, the bypass valve 56 is only actuated via the vacuum actuator. Thus, the amount of compression provided to one or more cylinders of the engine via a turbocharger or supercharger may be varied by controller 12.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control airflow from intake passage 42 to intake manifold 44 and combustion chamber 30 (and other engine cylinders). The position of throttle plate 64 may be provided to controller 12 by throttle position signal TP from throttle position sensor 158. An intercooler may be positioned between compressor 92 and intake valve 52 and coupled in manifold 44 downstream of the supercharger bypass.

Exhaust gas sensor 126 is shown coupled to exhaust manifold 48 upstream of emission control device 70. Sensor 126 may be any suitable sensor for providing an indication of exhaust gas air/fuel ratio of the engine exhaust such as a linear oxygen sensor or UEGO (universal or wide-range exhaust gas oxygen), a two-state oxygen sensor or EGO, a HEGO (heated EGO), a NOx, HC, or CO sensor.

Emission control device 70 is shown arranged along exhaust passage 58 downstream of exhaust gas sensor 126. Device 70 may be a three way catalyst (TWC), NOx trap, various other emission control devices, or combinations thereof.

The engine 10 may have an intake temperature sensor 124 and an exhaust temperature sensor 128. An intake temperature sensor 124 is shown coupled to intake passage 42 upstream of the throttle. An intake temperature sensor may also be located between the intake throttle 62 and compressor 94 of the boosting device. An exhaust temperature sensor 128 may be shown coupled to the exhaust manifold 48 and exhaust passage 58 between the gas sensor 126 and emission control device 70.

Intake temperature sensor 124 may measure the temperature of air upstream of compressor 94 and exhaust temperature sensor 128 may measure the temperature of the exhaust gas emitted from the exhaust manifold 48 of the engine 10. In this example, temperature sensor 124 provides supercharger outlet temperature. As described herein, responsive to the supercharger outlet temperature increasing with respect to first and second upper temperature thresholds, various operations may be provided to mitigate the temperature increase while continuing to provide requested engine operation. The operation may also monitor pressure ratio and provide an approach to maintain operation within pressure ratio ranges by adjusting volumetric efficiency via blow through adjustment, as well as eventually clipping airflow, such as via throttle 64, including when the vacuum actuated supercharger bypass valve 56 has limited adjustment due to lack of sufficient vacuum. The lack of vacuum may be determined by comparing manifold vacuum to atmospheric pressure, and indicating when that difference is less than a threshold that corresponds to a spring force holding the actuator in a default position. In an example, in addition to, or in place of, the supercharger outlet temperature sensor (e.g., sensor 124), the methods described herein may utilize an estimate of supercharge outlet temperature based on an air up-heat model.

The measured and/or estimated supercharger outlet temperature may be compared against a set of thresholds. When passing the first threshold, and where vacuum is below a threshold, the system actuates the variable cam timing phasers to a more efficient engine volumetric efficiency condition to mitigate temperature increases due to high engine load operation (e.g., engine load above an upper load threshold). If the modeled temperature continues to show increasing outlet temperature, an airflow mitigation, such as airflow clipping, is applied by the routines to alter engine airflow until the temperature is within a set range. The upper manifold pressure clip may be determined based on pressure ratio threshold and the current pressure ratio across the compressor. Once the vehicle is out of the operating conditions that causes these issues, the system can step back toward previous engine operation. Or, once vacuum is sufficient to further actuate the bypass 56, increased bypass can be provided as well to mitigate temperature rises of the supercharger outlet temperature.

Continuing with FIG. 1, an exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 136 as a part of the user input device 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a profile ignition pickup signal (PIP) from a crankshaft sensor 118, such as a hall effect sensor (or other type), coupled to crankshaft 40; a measurement of air mass entering the engine from mass airflow sensor 120; and a measurement of throttle position from sensor 158. In an example, sensor 121 may be a combined pressure and charge temperature sensor. Barometric pressure may also be sensed (sensor not shown) for processing by controller 12. In an example, sensor 122 may measure pressure upstream or downstream of a charge air cooler positioned downstream of the compressor.

In an aspect of the present description, crankshaft sensor 118, which may be used as an engine speed sensor, may produce a predetermined number of equally spaced pulses for each revolution of the crankshaft from which engine speed (RPM) can be determined. Such pulses may be relayed to controller 12 as a profile ignition pickup signal (PIP) as mentioned above.

As described above, FIG. 1 merely shows one cylinder of a multi-cylinder engine, and that each cylinder has its own set of intake/exhaust valves, fuel injectors, spark plugs, etc.

During operation, each cylinder within engine 10 undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as spark plug 91, resulting in combustion. Additionally or alternatively, compression may be used to ignite the air/fuel mixture. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, early intake valve closing, or various other examples.

Turning to FIG. 2, it shows a state chart 200 of the engine method that may be performed in the engine 10. The engine operations in state chart 200 may be influenced by various parameters, such as the temperatures in the intake and/or exhaust system. The state chart is carried out by instructions stored in memory of controller 12.

Engine state 202 includes various engine operation where temperature downstream of the compressor in the intake system, such as supercharger outlet temperature at a point upstream of the bypass flow return, and further also upstream of the intake manifold, is within a first threshold. State 202 includes various operations such as idle, drive, shut-down, etc. During state 202, the routine monitors supercharger outlet temperature (measured and/or estimated) as compared to the first supercharger outlet temperature threshold. When supercharger outlet temperature is below the first supercharger outlet temperature threshold, the system maintains operation in state 202. Otherwise, the system transitions to state 204. See FIG. 4 for further example details of the operation of state 202.

Engine state 204 includes operation that aims to mitigate further temperature rise while still enabling the engine to provide the operator requested engine output torque, which may utilize sustained high engine load over a duration, which may be several minutes. Engine state 204 includes adjustment to cam timing to add, or increase, engine blow through operation to increase volumetric efficiency while maintaining engine load, which can affect the pressure ratio across the compressor and mitigate increasing supercharger outlet temperature. An amount of positive valve overlap may be linearly or non-linearly proportional to a temperature difference between the supercharger outlet temperature and the first supercharger outlet temperature threshold, up to a maximum overlap threshold.

During operation in engine state 204, the routine monitors supercharger outlet temperature (measured and/or estimated) is compared to a second supercharger outlet temperature threshold (that is higher than the first supercharger outlet temperature threshold) for transitioning to state 206. Additionally, the system monitors supercharger outlet temperature (measured and/or estimated) as compared to the first supercharger outlet temperature threshold for returning to state 202.

Engine state 206 includes operation that aims to mitigate further temperature rise past a second outlet temperature threshold while still enabling the engine to provide the requested engine output torque, which may utilize sustained high engine load over a duration, which may be several minutes. Engine state 206 includes adjustment to mitigate and lower airflow from the compressor of the supercharger to reduce temperature while maintaining the volumetric efficiency and maintaining engine load of Engine state 204. State 206 may decrease pressure ratio across the compressor and mitigate increasing supercharger outlet temperature. An amount of air flow reduction from the supercharger outlet may be linearly or non-linearly proportional to a temperature difference between the supercharger outlet temperature and the second supercharger outlet temperature threshold, up to a maximum overlap threshold.

During operation in engine state 206, the routine monitors supercharger outlet temperature (measured and/or estimated) compared to a second supercharger outlet temperature threshold (that is higher than the first supercharger outlet temperature threshold) for transitioning to engine state 204.

Figure 3:
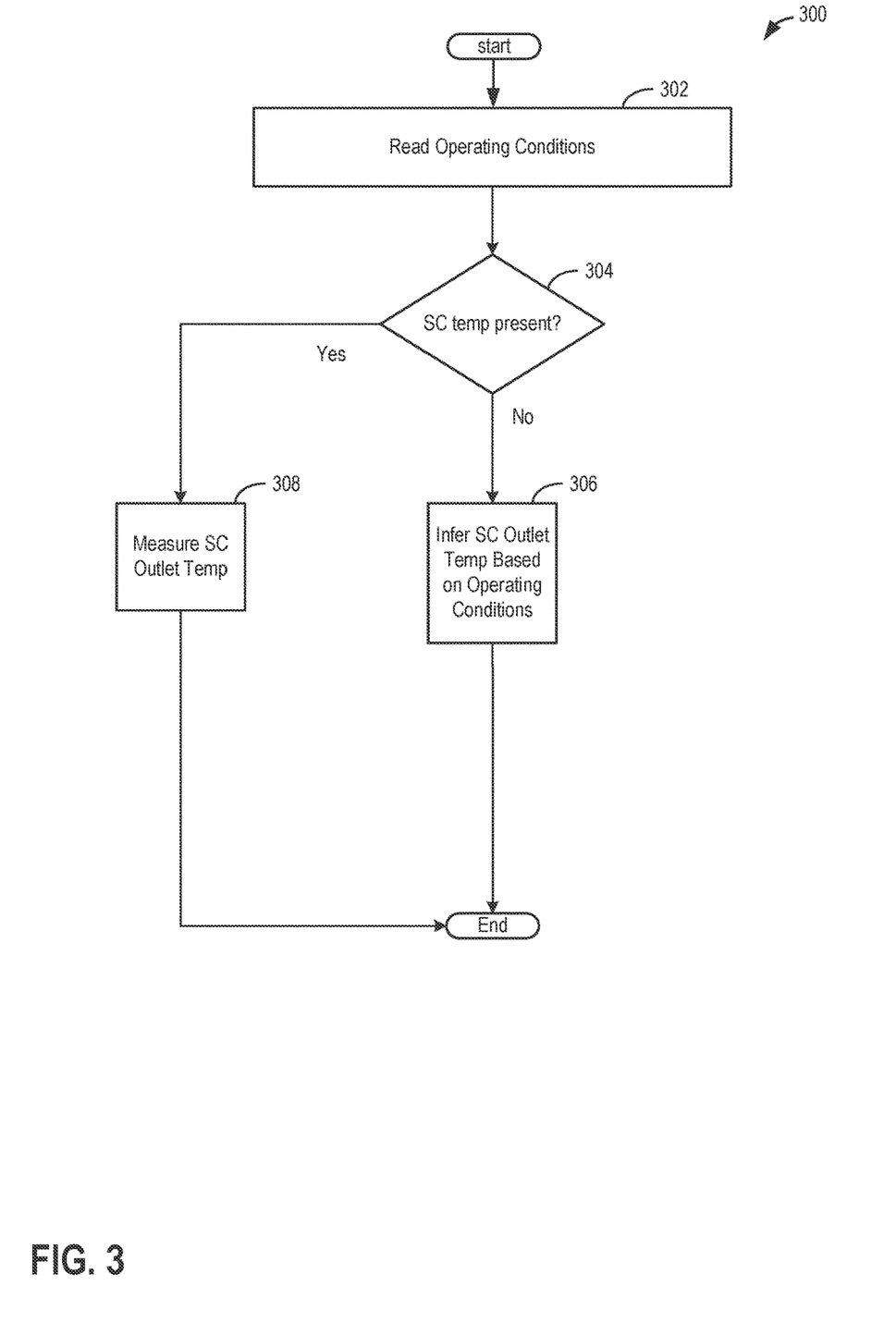
FIG. 3 portrays an example flowchart of the conditions and decision making for change in temperature.

Turning to FIG. 3, it shows a flow chart of a temperature determining method 300. Temperature determining method 300 shows how a controller, such as controller 12, may respond to and interpret temperature readings.

Method 300 starts at block 302 where the operating conditions are read by controller 12. For this example, controller 12 may also read and record operating conditions from an engine such as RPM of the crankshaft 40 and the current VCT conditions, as well as current temperatures, airflow, etc.

Method 300 continues to block 304. At block 304 the controller determines whether the temperature of air downstream of the supercharger is able to be measured via the sensor 124, such as based on whether the sensor is functioning properly and/or available.

If the temperature of the supercharger is readable by a sensor (e.g., 304 is Yes), method 300 continues to block 308. At block 308 the superconductor outlet temperature is measured by the sensor. For one example, the outlet temperature of the super charger may be determined from a temperature reading by the temperature sensor 124 reading the temperature of the outlet airflow near the compressor 94 outlet. After block 308, method 300 may end.

Returning to block 304, if a temperature of the supercharger is not able to be read (e.g., 304 is NO), method 300 may proceed to block 306. At block 306 the temperature of the supercharger may be inferred by a controller by data from other sensors and operating conditions in the engine, such as based on engine speed, engine load, ambient air temperature, temperature at other locations of the intake such as in manifold 44, EGR temperature, etc.

Various temperature models may be applied in the system and used to provide an approach for determining temperature of the supercharger, which can be difficult to identify accurately due to the heat transfer of the device itself and thermal variation at different boosting levels and engine operating loads. In an example, a rolling averaged temperature (time constant based on air mass through the supercharger) that is as follows. In a first part, supercharger inlet temperature is an input that is determined using an ambient charge temperature sensor upstream of the supercharger along with a temperature uplift determined based on air mass through the engine with a calibrated look-up table. The table may be calibrated to output the uplift amount, added to the temperature sensor upstream of the supercharger, based on the air mass through the engine.

Second, the resulting value of the first part is multiplied by a calibratable slope times the pressure ratio over the supercharger (outlet pressure divided by inlet pressure) and an offset coefficient that creates an instantaneous temperature estimated. The slope may be a single value determined by vehicle testing, or may be a function of engine coolant temperature. Third, the instantaneous temperature is then filtered to create a rolling averaged temperature which has a time constant based on air mass though the engine.

Figure 4:
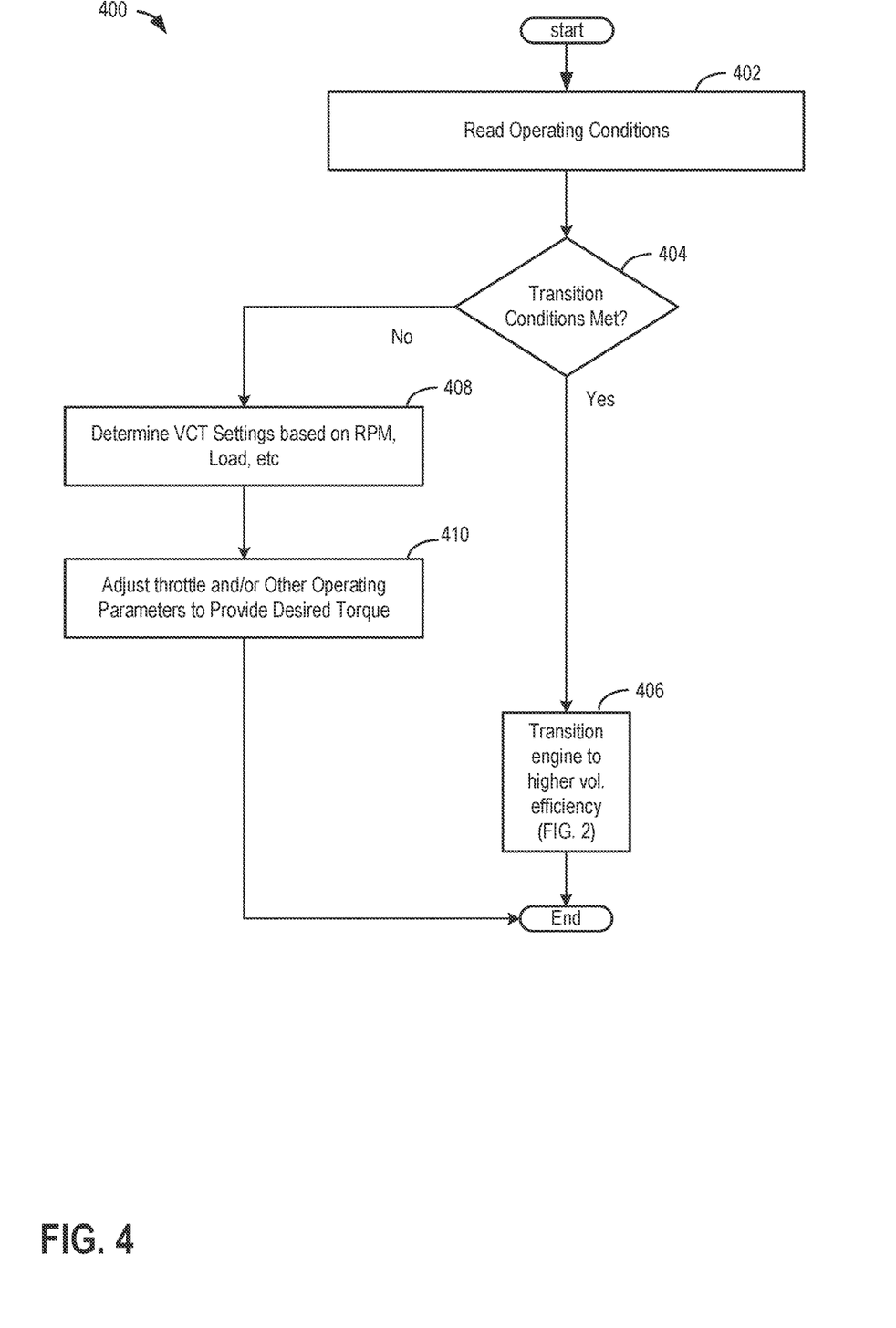
FIG. 4 portrays an example flowchart of the conditions and decision making for while in the normal VCT operations mode of FIG. 2.

Turning to FIG. 4, it shows a flow chart of method 400. Method 400 shows how controller 12 may make decisions, including adjusting various actuators to adjust engine operation, based on conditions in engine state 202.

At block 402, the routine reads operating conditions such as temperatures from sensor 124 and/or sensor 128, engine speed, engine load, cam timing, and input from an input device, such as input device 130. Once the operating conditions are read at 402, the method proceeds to block 404. At block 404 the transition conditions are determined. If the conditions for transitioning are met (e.g., block 404 is Yes), the method proceeds to block 406. At block 406, the method proceeds to transition to state 204 and thus adjust engine operation to a higher volumetric efficiency operation by adjusting valve timing, and optionally additional engine actuators.

At block 404, if the transition conditions are not met (e.g., 404 is no), the method may proceed to block 408. At block 408, the controller determines valve timing, such a VCT settings, based on operating conditions, such as RPM, temperature, engine load, etc., and adjust the valve actuators to provide the desired valve timing. After block 408, the method proceeds to block 410. At block 410, the throttle is adjusted to provide a requested torque, which may be an operator requested torque based on pedal position, vehicle speed, transmission gear ratio, etc.

After blocks 406 or 410 method 400 may end.

Figure 5:
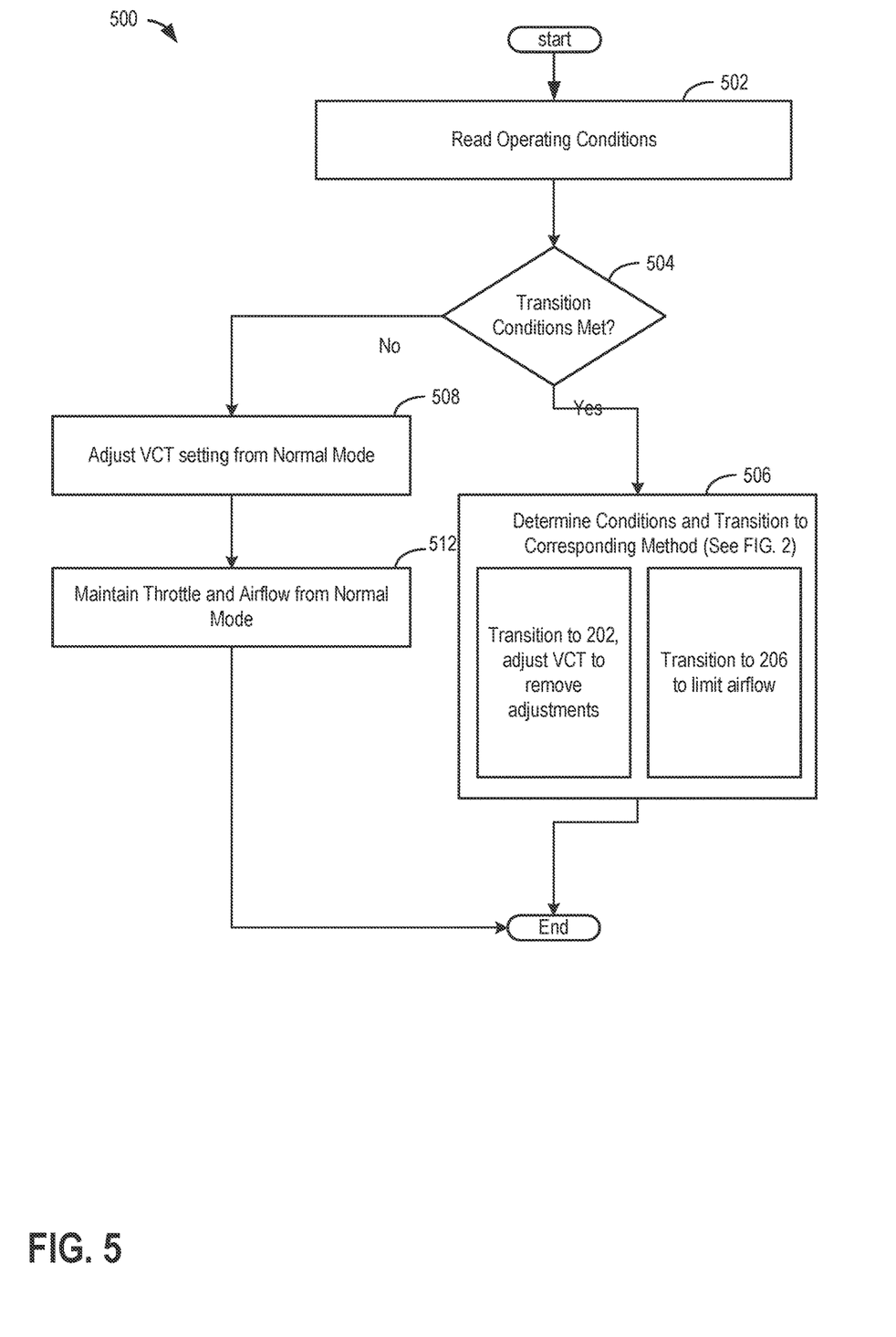
FIG. 5 portrays an example flowchart of the conditions and decision making for while in the altered VCT higher volumetric efficiency mode.

Turning to FIG. 5, it shows a flow chart of second engine method 500. Method 500 shows how a controller, such as controller 12, including adjusting various actuators to adjust engine operation, based on conditions in engine state 204.

At block 502, the routine reads operating conditions such as temperatures from sensor 124 and/or sensor 128, engine speed, engine load, cam timing, and input from an input device, such as input device 130. For example, the controller, such as controller 12, may read and record signals from an intake temperature sensor 124 and exhaust temperature sensor 128. For this example, controller 12 may also read and record other operating conditions from an engine such as RPM of the crankshaft 40 and the current VCT conditions.

Once the operating conditions are read at 502, method 500 proceeds to block 504. At block 504 the transition conditions are determined. If the conditions for transitioning are met at block 504 (e.g. block 504 is yes), method 204 proceeds to block 506. At block 506 the engine state 204 determines the transition condition to transition to and proceeds to transition from engine state 204 to engine state 202 or engine state 206. Specifically, the system stays in 204 when the answer to 504 is NO, and continues to different transitions at 506 depending on the operating conditions as set forth in FIG. 2. In an example, when transitioning to 202, the supercharger outlet conditions have transitioned below the relevant temperature limit (which may include with hysteresis). When transitioning to 206, the supercharger temperature keeps climbing above another temperature limit and then airflow is limited.

After block 506 method 204 may end. At block 506, the method may proceed to transition to state 202 and thus adjust engine operation to a lower volumetric efficiency operation by adjusting valve timing, and optionally additional engine actuators. At block 506, the method may proceed to transition to state 206 and maintain a similar volumetric efficiency operation and valve timing while mitigating airflow, via operations such as the airflow clipping, during airflow mitigation mode.

Returning to block 504, if the transition conditions are not met (e.g., 504 is no) method 204 may proceed to block 508. At block 508, the VCT settings from engine state 202 are adjusted to a higher volumetric efficiency at engine state 204. At block 508, the controller determines valve timing, such a VCT settings, based on operating conditions, such as RPM, temperature, engine load, etc., and the outlet temperature of the supercharger to adjust the valve actuators to provide the desired valve timing.

After block 508 is complete, method 204 may proceed to block 512. At block 512, the throttle is adjusted to provide a requested torque, which as explained herein may be based on pedal position, vehicle speed, transmission gear ratio, etc. At block 512 the throttle and air are adjusted or maintained at a level similar to the engine state 202.

After blocks 506 or 512 method 500 may end.

Figure 6:
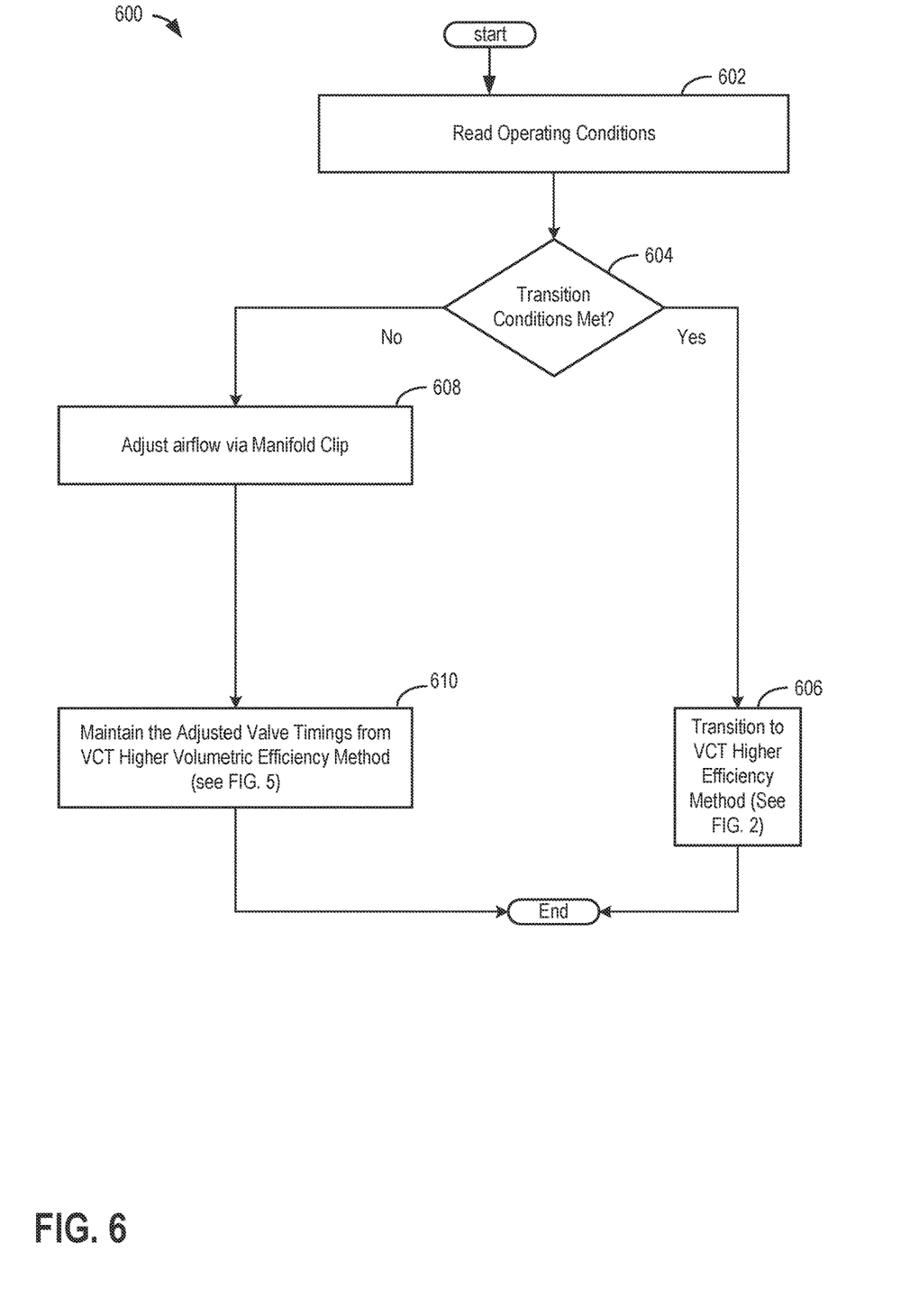
FIG. 6 portrays an example flowchart of the conditions and decision making for while in the limited engine flow mode.

Turning to FIG. 6, it shows a flow chart of engine method 600. Method 600 shows how controller 12 may make decisions, including adjusting various actuators to adjust engine operation, based on conditions in engine state 206.

At block 602, the routine reads operating conditions such as temperatures from sensor 124 and/or sensor 128, engine speed, engine load, cam timing, and input from an input device, such as input device 130. Once the operating conditions are read at 602, the method proceeds to block 604. At block 604 the transition conditions are determined. If the conditions for transitioning are met (e.g., block 604 is Yes), the method proceeds to block 606. At block 606, the method proceeds to transition to state 204 and thus maintain a similar volumetric efficiency operation and valve timing while stopping the mitigation airflow mode.

At block 604, if the transition conditions are not met (e.g., 604 is no), the method may proceed to block 608. At block 608, the controller determines and applies airflow mitigation, such adjusting airflow via a manifold clip algorithm, based on the outlet temperature of the supercharger and operating conditions, such as RPM, engine temperature, engine load, etc., and adjust the valve actuators to provide a desired airflow. The airflow at block 608 may be altered via actuators such as via the throttle plate 62.

For example, the manifold pressure clip may be delivered via a torque request reduction that reduces the torque request from the operator requested torque, where the pressure is reduced to the clip via the throttle actuator and throttle (62, 64). In some boosted applications, such as turbocharged applications, a turbocharger wastegate actuators may be the actuator adjusted, optionally in combination with throttle adjustments. The value of the manifold pressure clip may be a fixed value selected based on engine testing, or may be variable based on operating parameters, such as via a look-up table calibrated as a function of vehicle speed. As explained above with regard to FIGS. 2-6, the inlet and outlet supercharger temperatures are used to trigger the manifold clip operation.

In a more specific example, a maximum temperature may be specified and the system determines a temperature ratio of current outlet temperature divided by maximum outlet temperature. With that temperature ratio and the current pressure ratio across the supercharger, a desired supercharger pressure ratio (outlet pressure divided by inlet pressure) is determined and then converted into a desired manifold pressure for the current operating condition. That manifold pressure is then clipped to be no lower than barometric pressure plus/minus an offset term that allows for variation in barometric pressure, such as due to altitude variation that is typical for the region of the vehicle.

After block 608, the method proceeds to block 610. At block 610, the higher volumetric efficiency VCT settings from engine state 204 are maintained. At block 610, the controller determines valve timing, such a VCT settings, based on operating conditions, such as RPM, temperature, engine load, etc., and the outlet temperature of the supercharger to adjust the valve actuators to provide the desired valve timing.

After blocks 606 or 610 method 600 may end.

In this way, the system can increase the engine operation without airflow limiting and better meet emission requirements, while still protecting the supercharger from temperature degradation due to over-temperature operation. Enabling operation without airflow limiting enables an operator requested torque to be provided by the engine system, as opposed to airflow limiting which may reduce operator requested torque to a lower, adjusted requested torque, that is then provided by the engine system, with airflow limited by the throttle.

In some examples, additional modes or states of operation may be provided. For example, if operating in state 202, the system may also monitor supercharger pressure ratio. If current pressure ratio request goes above a calibrated limit value that is determined from engine testing, the system may immediately move to operation in state 206, bypassing state 204, to reduce potential hardware degradation. This will move both variable cam timing systems of each bank of the engine (in a two bank example) a higher efficiency location and impose a MAP limit. The MAP limit in this particular case is then set to barometric pressure plus/minus an offset to account for altitude.

Figure 7:
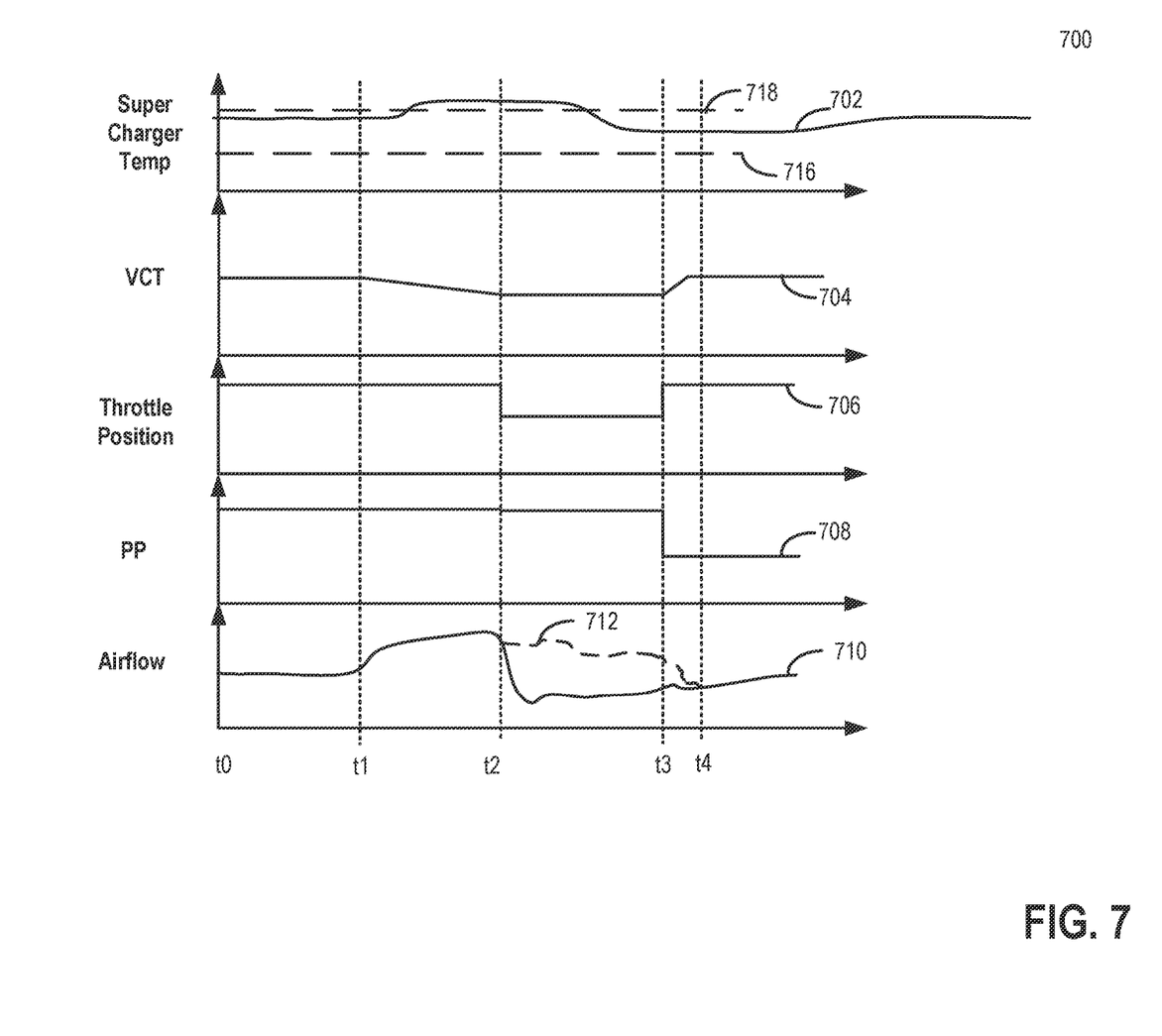
FIG. 7 shows a time response diagram of an example where components respond to temperature change.

Turning to FIG. 7, it shows a series of time diagrams 700. The time diagrams 700 show examples of how components, signals, and VCT may react to the estimated temperature change the super charger. The temperature change of the super charger may be based on a temperature from the intake temperature sensor 124 and exhaust temperature sensor 128. The super charger temperature is represented by plot 702.

VCT plot 704 represents the change in VCT time cycle between the normal VCT mode (e.g., the VCT mode in engine state 202) and a volumetric efficiency VCT mode (e.g., the VCT mode in the engine state 204 and third engine state 206).

Throttle position plot 706 shows the change in throttle position over time. Driver pedal position PP plot 708 shows the position of a pedal, such as input device 130, changed by a vehicle operator, such as vehicle operator 132, over time. Airflow plot 710 shows the increase and/or decrease in volumetric flowrate of air over time. The dashed line 712 illustrates the airflow that would be provided based on the operator torque request without the airflow limiting. Compressor bypass plot 714 shows position of a bypass for the supercharger, such as in bypass channel 50.

The plot 702 may have a first threshold temperature 716 and a second threshold temperature 718 represented by dotted lines. The bypass position is generally more closed with low airflow (high vacuum relative to ambient) and more open with high manifold absolute pressure (low vacuum versus ambient).

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an internal combustion engine, comprising:
   operating the engine with boosted intake pressure via a supercharger and with supercharger flow regulated by a vacuum actuated bypass valve; and
   in response to an estimated supercharger outlet temperature being greater than a first threshold, increasing a blow through air passing from an engine intake to an engine exhaust without combustion in a cylinder of the engine due to engine intake and exhaust valves having positive valve overlap; and then, in response to the estimated supercharger outlet temperature being greater than a second, higher threshold, limiting engine airflow.

2. The method of claim 1 wherein the supercharger is driven from a crankshaft of the engine.

3. The method of claim 1 wherein the supercharger bypass valve is the only bypass valve around the supercharger and is only actuated via a vacuum actuator.

4. The method of claim 1 wherein the method further comprises:
   in response to the estimated supercharger outlet temperature falling below the second threshold but still above the first threshold, discontinuing the limiting engine airflow.

5. The method of claim 1 wherein valve overlap is adjusted by a variable cam timing system that adjusts intake valve timing.

6. The method of claim 1 wherein increasing blow through air includes adjusting cam timing from negative valve overlap to positive valve overlap.

7. A system, comprising:
   an engine having positive valve overlap in at least some boosted conditions;
   a supercharger coupled to the engine;
   a supercharger bypass having a vacuum actuated bypass valve;
   a throttle upstream of the supercharger; and a controller with instructions that when executed operate the engine with boosted intake pressure via the supercharger and with supercharger bypass operation limited by the vacuum actuated bypass valve being unable to be adjusted due to limited vacuum, and in response to an estimated supercharger outlet temperature being greater than a first threshold, increasing a blow through air passing from an engine intake to an engine exhaust without combustion in a cylinder of the engine due to engine intake and exhaust valves having positive valve overlap without limiting engine airflow via the throttle, and then, in response to the estimated supercharger outlet temperature being greater than a second, higher threshold, limiting engine airflow.

8. The system of claim 7 wherein the supercharger is driven from a crankshaft of the engine.

9. The system of claim 8 wherein the supercharger bypass valve is the only bypass valve around the supercharger and is only actuated via a vacuum actuator.

10. The system of claim 9 wherein the instructions further include, in response to the estimated supercharger outlet temperature falling below the second threshold but still above the first threshold, discontinuing the limiting engine airflow.

11. The system of claim 7 wherein valve overlap is adjusted by a variable cam timing system that adjusts intake valve timing.

12. The system of claim 11 wherein increasing blow through air includes adjusting cam timing from negative valve overlap to positive valve overlap.

13. A system, comprising:
an engine having positive valve overlap in at least some boosted conditions;
a supercharger driven from a crankshaft of the engine;
a supercharger bypass having a vacuum actuated bypass valve;
a throttle upstream of the supercharger;
a temperature sensor coupled upstream of the throttle; and
a controller with instructions that when executed operate the engine with boosted intake pressure via the supercharger and with supercharger bypass operation limited by the vacuum actuated bypass valve being unable to be adjusted due to limited vacuum, and in response to an estimated supercharger outlet temperature being greater than a first threshold, increasing a blow through air passing from an engine intake to an engine exhaust without combustion in a cylinder of the engine due to engine intake and exhaust valves having positive valve overlap without limiting engine airflow via the throttle, and then, in response to the estimated supercharger outlet temperature being greater than a second, higher threshold, limiting engine airflow, the estimated supercharger outlet temperature determined based on the temperature sensor and operating conditions.

14. The system of claim 13 wherein the instructions further include, in response to the estimated supercharger outlet temperature falling below the second threshold but still above the first threshold, discontinuing the limiting engine airflow.

* * * * *